Patented June 24, 1924.

1,498,866

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

TREATMENT OF PLATES FOR STORAGE BATTERIES.

No Drawing. Application filed June 22, 1923. Serial No. 647,192.

*To all whom it may concern:*

Be it known that I, CAMPBELL C. CARPENTER, a citizen of the United States, residing at Niagara Falls, in the county of Niagara and State of New York, have invented new and useful Improvements in the Treatment of Plates for Storage Batteries, of which the following is a specification.

This invention relates to treatment of plates for storage batteries.

An object of the invention is to prevent shrinkage during the drying of storage battery plates.

A further object of the invention is to prevent an excess of scrap in plate manufacture.

A great deal of difficulty has been experienced in the manufacture of plates for storage batteries, due to the fact that when it is attempted to dry a plate after the active material has been pasted into the grid, a considerable shrinkage of active material takes place. This shrinkage causes the active material to drop out of the plate or to be insecurely held in the grid and thus causes an excessive amount of scrap in manufacturing and produces defective plates which cause trouble in service. It has been suggested that instead of drying the plates in the air, they be dipped in sulphuric acid immediately after pasting, which operation hardens the surface of the plate and permits the plate surface to dry without excessive shrinkage. It has been found, however, that the interior of the plate shrinks away from the grid and gives rise to very much the same trouble as when the plate is dried in air.

In describing the present invention, reference is made to details of the process which represent the best embodiment of the invention so far determined. It is not intended, however, that the specific description shall be construed except as illustrating the preferred embodiment of the invention, as it is obvious that changes may be made in details without departing from the spirit of the invention as set forth in the appended claims.

In carrying out the invention, freshly pasted plates are enclosed in an air-tight compartment over water and allowed to remain for a period of twelve hours or more. It has been found that these plates may be taken out and dried in any preferred manner and will not show sufficient shrinkage to cause the troubles above enumerated. It has been found further that the process may be accelerated if the humid atmosphere is made alkaline by means of ammonia gas.

The further hydration of the active material, due to standing in the moist atmosphere, and especially where this hydration has been accelerated by the introduction of ammonia gas, is apparently the means which prevents shrinkage. This hydration evidently produces an increase in volume of the active material which can be dried without appreciable shrinkage.

What I claim as new and desire to secure by Letters Patent of the United States is:—

1. The process of treating battery plates which comprises enclosing the freshly pasted plate in a humid atmosphere and thereafter drying the plate.

2. A process for the treatment of battery plates which comprises introducing the freshly pasted plates into a sealed compartment in which the atmosphere has been moistened, allowing the plates to remain for a period of time, and subsequently removing the plates and drying.

3. The process of preparing battery plates which comprises introducing the freshly pasted plates into a humid atmosphere which has been made alkaline, allowing the plates to remain for a period of time and subsequently drying the plates.

4. The process of treating battery plates which comprises storing the plates in a closed compartment over water in which the air has been made alkaline by the introduction of ammonia gas and then removing the plates and drying them.

In witness whereof, I have hereunto subscribed my name.

CAMPBELL C. CARPENTER.